Figure 1:
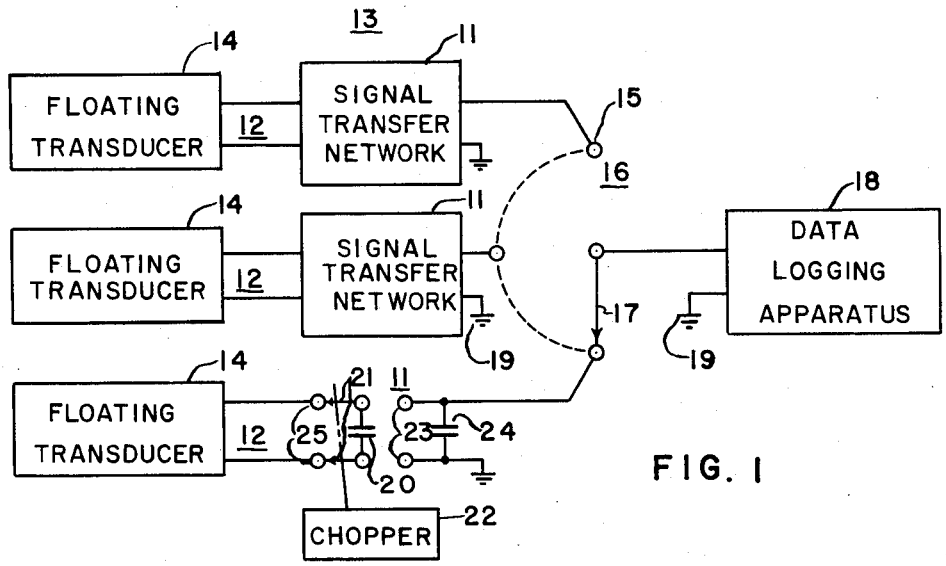

United States Patent Office 3,059,220
Patented Oct. 16, 1962

3,059,220
APPARATUS FOR COUPLING A PLURALITY OF UNGROUNDED CIRCUITS TO A GROUNDED CIRCUIT
John Dimeff, San Jose, Calif., assignor to the United States of America as represented by the Administrator of the National Aeronautics and Space Administration
Filed July 2, 1959, Ser. No. 824,755
4 Claims. (Cl. 340—147)
(Granted under Title 35, U.S. Code (1952), sec. 266)

The invention described herein may be manufactured and used by or for the Government of the United States of America for governmental purposes without the payment of any royalties thereon or therefor.

This invention relates generally to signal translating circuitry, and more particularly to a high-speed electromechanical signal transferring and switching circuit for sequentially connecting a series of ungrounded and/or grounded input stages to a common grounded output stage.

In the art of high-speed data logging, the electrical intelligence signals on a large number of individual signal transmission channels are rapidly sampled in sequence and individually applied to a common recording, or reading, device wherein the magnitudes of the sampled signals are recorded in one of the many conventional forms, such for example as on punch paper or cards, magnetic tape, or memory cores. In general, each of the monitored channels includes a transducer device for generating the intelligence signal to be sampled. In some types of transducers, such for example as a microphone, one terminal of the transducer is at ground potential. No problem exists in connecting channels having transducers of this type to conventional data logging apparatus. However, there are other types of transducers, such for example as the resistance wire strain gage, both of the terminals of which are at potential levels above ground. Data logging operations of signal transmission channels having transducers of this second type have been found to be susceptible to erroneous readings resulting from the large transient signals occasionally developed during channel switching due to differences in the level of the common mode voltage of the channels. In addition, monitoring of a number of floating transducers has necessitated the use of dual bank selector devices to provide an individual electrical connection to each of the transducer terminals.

A common practice of resolving the hereinbefore set forth problems in the sequential switching of a number of floating transducer channels involves the insertion of an amplifier circuit into each channel to which both terminals of the transducer are connected. The amplifier is designed to provide a high rejection of the common mode voltage appearing across the two terminals and to develop a single output signal having an amplitude relative to ground corresponding to the potential difference between the potential levels of the two transducer terminals. With this arrangement, only a single bank selector device is required. Although satisfactory results are obtained by this present day practice, it will be obvious that the expense of initial installation and maintenance of an amplifier in each signal transmission channel renders this method somewhat objectionable.

Accordingly, it is an object of the present invention to provide a new and improved circuit switching arrangement particularly suited for use with floating signal transmission channels.

Another object of this invention is the provision of simple, compact and inexpensive electro-mechanical circuit means for converting the floating intelligence signal appearing between the terminals of an ungrounded transducer into a signal having a potential level relationship to electrical ground.

Still another object of the instant invention is to provide a new and improved isolation and switching circuit arrangement for accurately and reliably transferring the floating intelligence signal appearing on a plurality of individual ungrounded intelligence signal generating channels to a common electrically grounded intelligence recording apparatus.

A further object of this invention is to provide a new and improved signal transfer circuit for transferring an intelligence signal developed by an ungrounded transducer in a particular frequency band to an electrically grounded utilization device.

A still further object of the instant invention is to provide a new and improved signal translating network for transferring the intelligence signal developed by an electrically floating transducer to an electrically grounded utilization circuit which includes means for neutralizing the deleterious effects of stray capacitances.

According to the invention, the foregoing and other objects are attained by the inclusion in a signal transmission channel of an electromechanical chopper for alternatively charging an ungrounded energy storage means from the floating signal generating device and then discharging the ungrounded energy storage means into a grounded energy storage means. By means of this arrangement the floating signal generating device is effectively isolated and an electrical signal relative to ground is provided at the output of the channel.

Figure 2:
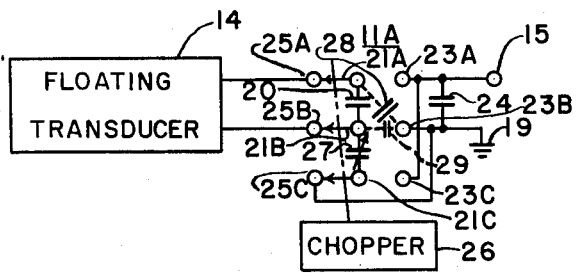

A more complete understanding of the invention and many of the attendant advantages thereof will be readily appreciated as the same becomes better understood by reference to the following detailed description when considered in connection with the accompanying drawing wherein:

FIG. 1 is a schematic view of one embodiment of the signal translating network in accordance with the invention; and, FIG. 2 is a schematic view of an alternative embodiment of the signal translating network in accordance with the invention.

Referring now to the drawing wherein like reference numerals designate identical or corresponding parts throughout the several views, and more particularly to FIG. 1, the signal transfer network, generally indicated by the reference numeral 11, is shown as being included in the individual channels 12 of a multiple channel signal transmission system 13. Each of the signal transmission channels has an electrically ungrounded, or floating, transducer element 14 as its intelligence signal generating source. Each channel is electrically connected to an individual stationary terminal, or contact, 15 of a multiple channel selector device, such for example as a stepping switch relay 16, having a movable contact, or wiper arm, 17 for sequentially engaging each of the stationary contacts 15. The movable contact 17 is electrically connected to a utilization device, such for example as a data logging apparatus 18 which is connected to electrical ground 19.

Inasmuch as the circuit configuration of each signal transfer network is identical, only the signal transfer network of the last channel of the multiple channel signal transmission system 13 is illustrated in detail.

As shown, the signal transfer network 11 consists of an energy storage device such for example as the fixed condenser 20 electrically connected between the two moving contacts 21 of a conventional double pole, double throw electromechanical chopper 22. Across the stationary output terminals 23 of the chopper, there is electrically connected another energy storage device, such for example as the fixed condenser 24, one side of which is connected to electrical ground 19. The output leads of the ungrounded transducer 14 are connected to the stationary input terminals 25 of the chopper 22. In operation, the moving contacts 21 initially place the ungrounded condenser 20 across the input terminals 25 thereby depositing an electrical charge thereon, and subsequently place the condenser 20 across the output terminals 23 thereby effecting a transfer of the electrical charge to the grounded condenser 24. Under the repetitive action of the chopper 22 a charge is continually transferred to the grounded condenser 24 from the ungrounded condenser 20 until the potential across terminals 23 exactly equals the potential developed by the transducer 14 across terminals 25. It will be apparent to one skilled in the art that the potential signal relative to ground 19 produced across condenser 24 is representative of the intelligence signal developed by transducer 14, and that due to the isolation effected between the floating transducer 14 and the grounded condenser 24, errors in the data recorded by apparatus 17, resulting from differences in the level of the common mode voltages of the channels, have been eliminated.

The rate of signal transformation effected by the network 11 is controlled by the relative capacity ratings of condensers 20 and 24, and the frequency of operation of the chopper 22. By reason of this, the signal transfer network 11 can also provide a filtering action during the signal transformation operation. For example, the capacity of condenser 20 can be selected to be considerably smaller than the capacity of condenser 24 thereby requiring condenser 20 to undergo a relatively large number of transfer cycles in order to charge the condenser 24 to a level representative of the potential across terminals 25. The potential signal appearing across condenser 24 is therefore unaffected by any high frequency variations in the signal appearing across terminals 25, and consequently, can be made to indicate the average value of the intelligence signal developed by the transducer 14. The nature of the filtering action provided by the transfer network 11 is also controlled by the operating frequency of the chopper; namely, as the chopper operating frequency decreases, the high frequency rejection characteristic of the filter network is improved.

When the parameters of transfer network 11 are selected to eliminate all but the extremely low frequency intelligence signals developed by the transducer 14, the magnitudes of the stray capacitances from the moving contacts 21 to ground when the chopper is in the open position are not negligible relative to the capacity ratings of condensers 20 and 24. Unless these stray capacitances are compensated for, the charge developed across condenser 24 will not be an accurate representation of the transducer developed intelligence signal.

In FIG. 2, there is shown an alternative arrangement of the signal transfer, or translating, network 11a in accordance with the present invention wherein a conventional triple pole, double throw electromechanical chopper 26 is substituted for the double pole, double throw chopper 22 of FIG. 1. In this arrangement the additional input terminal 25c of the chopper is electrically connected to ground 19 through output terminal 23b, and the additional output terminal 23c is electrically connected to output terminal 23a. A variable condenser 27 is electrically connected between the two moving contacts 21b and 21c of chopper 26.

For the purpose of facilitating explanation of the operation of the signal transfer network arrangement 11a in neutralizing the effects of stray capacitances the stray capacitances from moving contacts 21a and 21b are depicted by condensers 28 and 29, respectively, drawn in broken line construction. When the moving contacts 21a and 21b engage input terminals 25a and 25b, respectively, the condensers 28 and 29 are charged to the common mode voltage potential characteristic of the floating transducer coupled across the input terminals. Upon operation of the chopper moving contacts into engagement with its output terminals, the charge on stray condenser 29 is dissipated by radiation and by resistance losses introduced by current circulation through the shorting circuit provided between chopper contacts 23b and 21b, and no portion of this charge appears across condenser 24. In the absence of the compensation means provided in the embodiment of FIG. 2, the charge on stray condenser 28 is shared between the combination of condensers 20, 24, and 28 upon engagement of chopper terminals 21a and 23a thereby affecting the charge across the condenser 24. In the embodiment of FIG. 2, however, when the moving contacts engage the input terminals, the stray condenser 28 is charged so that the top plate thereof is of the same polarity as the top plate of variable condenser 27, when the signals at 25a and 25b have the same relationship to ground. When the chopper moving contacts are operated to engage the output terminals thereof, condenser 27 like stray condenser 28 shares its charge between condensers 20, 24 and 28, except that the polarity of the charge from stray condenser 28 is opposite in polarity to the charge from condenser 27. By proper adjustment of variable condenser 27, the deleterious effects of the stray capacitances can be eliminated.

Obviously many modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A coupling network for transferring a signal from an ungrounded input circuit to a grounded output circuit comprising a plurality of stationary input terminals, a first and second ones of which are electrically coupled to the ungrounded input circuit, a plurality of stationary output terminals, a first and second ones of which are electrically coupled to the ground output circuit, the first and third ones of which are electrically interconnected, the third one of said input terminals being electrically coupled to said second one of said output terminals, said second one of said output terminals being connected to electrical ground, a first fixed condenser electrically coupled across said first and second ones of said output terminals, a plurality of movable terminals, a second fixed condenser electrically coupled between the first and second ones of said movable terminals, a variable condenser electrically coupled between the second and third ones of said movable terminals, and means for alternatively operating said first, second and third of said plurality of movable terminals into operative engagement with said first, second and third, respectively, of said plurality of input terminals and said first, second and third, respectively, of said plurality of output terminals at a predetermined operational rate, whereby, when said first and second of said plurality of input terminals are at potentials having the same polarity with respect to ground, compensation for stray capacitance is provided.

2. A coupling network according to claim 1 wherein the capacity of said first fixed condenser is substantially larger than the capacity of said second fixed condenser.

3. A signal translating system for sequentially coupling an electrically grounded utilization device to a multiplicity of channels each having an electrically ungrounded transducer therein comprising a coupling network individual to each of the channels, said coupling network including a first trio of stationary terminals, the first and second ones of which are electrically connected to the ungrounded transducer of the respective channel, a second trio of stationary terminals, the first and third ones of which are electrically interconnected and the second one of which is electrically connected to ground and to the third one of said first trio of terminals, a first fixed condenser electrically connected across said first and second ones of said second trio of terminals, a trio of movable terminals operable to alternatively engage said first and second trio of terminals, a second fixed condenser electrically connected across the first and second ones of said movable terminals, a variable condenser electrically connected across the second and third ones of said movable terminals, and means for operating said trio of movable terminals at a preselected rate into alternate engagement with said first and second trios of stationary terminals, said first, second and third movable terminals respectively engaging said first, second and third stationary terminals of the trios, and a channel selector switch having a plurality of stationary contacts and a single movable contact for sequentially engaging each of said stationary contacts, each of said stationary contacts being individually electrically connected to said first one of said second trio of stationary terminals of one of the channels, and said movable contact being electrically connected to the grounded utilization device, whereby, when said first and second of said first trio of stationary terminals are at potentials having the same polarity with respect to ground, compensation for stray capacitance is provided.

4. A signal translating system according to claim 3 wherein the capacity of said first fixed condenser is of a preselected magnitude relative to the capacity of said second fixed condenser thereby to provide a desired amount of filtering action.

References Cited in the file of this patent

UNITED STATES PATENTS

| | | |
|---|---|---|
| 2,275,736 | Cloud | Mar. 10, 1942 |
| 2,697,191 | Wannamaker | Dec. 14, 1954 |
| 2,750,547 | Wannamaker | June 12, 1956 |
| 2,836,734 | Cichanowicz | May 27, 1958 |
| 2,843,839 | Cunningham | July 15, 1958 |
| 2,889,470 | Gray | June 2, 1959 |
| 2,907,902 | McIntosh et al. | Oct. 6, 1959 |
| 2,937,369 | Newbold et al. | May 17, 1960 |